United States Patent
Guo

(10) Patent No.: US 9,037,512 B2
(45) Date of Patent: May 19, 2015

(54) INFORMATION TECHNOLOGY RESOURCE ALLOCATION AND UTILIZATION TRACKING IN A CLOUD-BASED SYSTEM

(75) Inventor: Feng Golfen Guo, Shanghai (CN)

(73) Assignee: EMC Corporation, Hopkinton, MA (US)

(*) Notice: Subject to any disclaimer, the term of this patent is extended or adjusted under 35 U.S.C. 154(b) by 429 days.

(21) Appl. No.: 12/979,450

(22) Filed: Dec. 28, 2010

(65) Prior Publication Data

US 2012/0166323 A1 Jun. 28, 2012

(30) Foreign Application Priority Data

Dec. 23, 2010 (CN) .......................... 2010 1 0601491

(51) Int. Cl.
| | |
|---|---|
| G06F 21/00 | (2013.01) |
| G06Q 30/04 | (2012.01) |
| G06F 11/34 | (2006.01) |
| G06F 21/10 | (2013.01) |

(52) U.S. Cl.
CPC ................ G06Q 30/04 (2013.01); G06F 21/10 (2013.01); G06F 11/3409 (2013.01); G06F 2201/81 (2013.01); G06F 2201/815 (2013.01)

(58) Field of Classification Search
CPC ...................................................... G06F 21/10
USPC .......................... 705/34, 52; 707/103; 709/223
See application file for complete search history.

(56) References Cited

U.S. PATENT DOCUMENTS

| | | | |
|---|---|---|---|
| 2002/0091674 A1* | 7/2002 | Azuma .............................. 707/1 |
| 2006/0190482 A1* | 8/2006 | Kishan et al. .............. 707/103 Y |
| 2008/0089516 A1* | 4/2008 | Cocchi et al. .................. 380/200 |
| 2010/0027528 A1* | 2/2010 | Davidson et al. ............. 370/352 |
| 2010/0325206 A1* | 12/2010 | Dayal et al. .................... 709/204 |
| 2011/0307573 A1* | 12/2011 | Lingafelt et al. .............. 709/217 |
| 2012/0011578 A1* | 1/2012 | Hinton et al. ...................... 726/8 |

* cited by examiner

Primary Examiner — Hunter Wilder
(74) Attorney, Agent, or Firm — Ryan, Mason & Lewis, LLP

(57) ABSTRACT

An apparatus for allocating and tracking utilization of information technology resources of a distributed virtual infrastructure comprises at least one processing platform associated with the distributed virtual infrastructure. The processing platform comprises at least one processing device having a processor coupled to a memory. The processing platform is operative to allocate at least a designated one of the information technology resources to a user responsive to a corresponding request, to track utilization of the designated information technology resource allocated to the user, and to generate one or more notifications if the utilization of the designated information technology resource by the user falls below a specified threshold. The distributed virtual infrastructure may comprise an enterprise private cloud infrastructure.

21 Claims, 8 Drawing Sheets

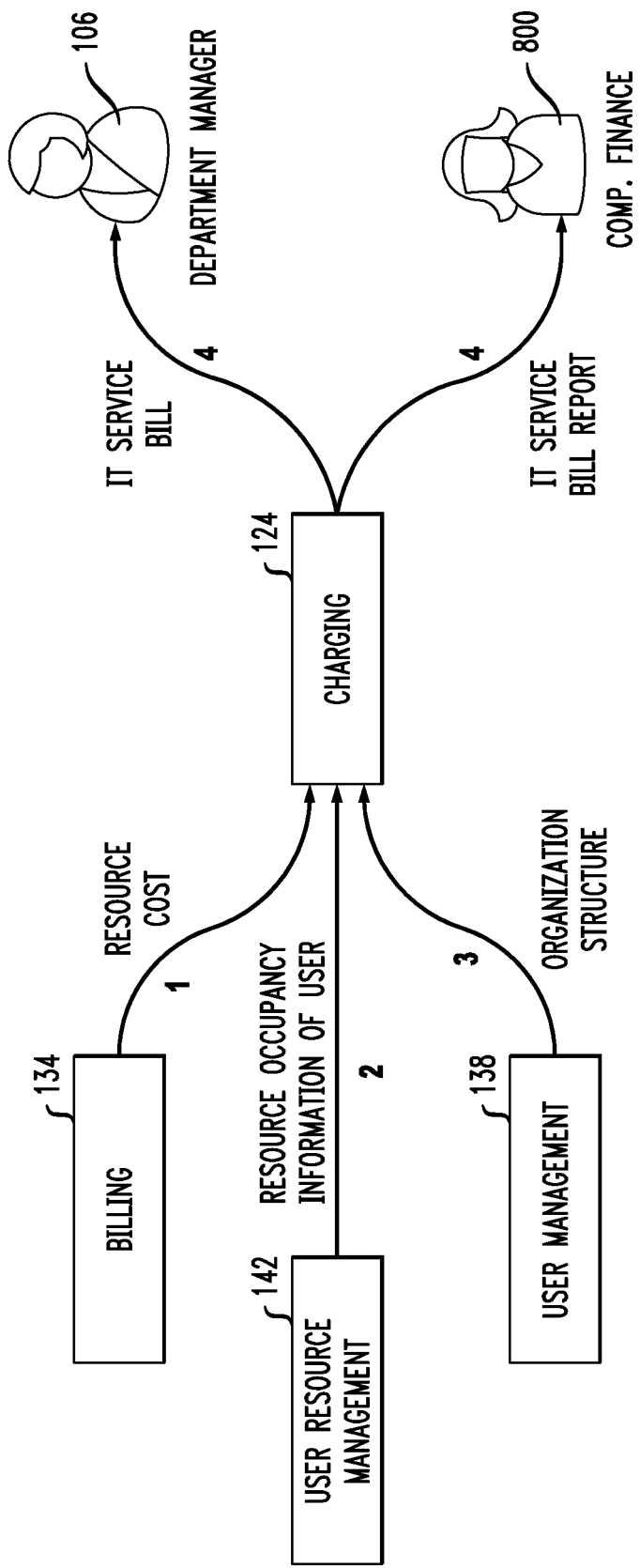

INFORMATION TECHNOLOGY RESOURCE ALLOCATION AND UTILIZATION TRACKING IN A CLOUD-BASED SYSTEM

PRIORITY CLAIM

The present application claims the priority of Chinese Patent Application No. 201010601491.7 filed Dec. 23, 2010.

FIELD OF THE INVENTION

The present invention relates generally to the field of information processing, and more particularly to techniques for managing information technology resources of a distributed virtual infrastructure.

BACKGROUND OF THE INVENTION

Virtualization is being rapidly adopted across the information technology industry. Virtualization generally allows any number of virtual machines to run on a single physical machine, with each virtual machine sharing the resources of that one physical machine. Different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords an ability for multiple operating systems to run concurrently on a single physical computer and share hardware resources with each other.

Commercially available virtualization software such as VMware® vSphere™ may be used to build complex virtual infrastructure, including private and public cloud computing and storage systems, distributed across hundreds of interconnected physical computers and storage devices. Such arrangements advantageously avoid the need to assign servers, storage devices or network bandwidth permanently to each application. Instead, the available hardware resources are dynamically allocated when and where they are needed. High priority applications can therefore be allocated the necessary resources without the expense of dedicated hardware used only at peak times.

As virtual infrastructure becomes more complex and more widely distributed over larger numbers of physical machines, it is becoming increasingly difficult to ensure that information technology resources are being utilized efficiently. For example, in an enterprise private cloud environment, conventional techniques for allocating resources among users and business units and tracking utilization of such resources are often non-standardized and haphazard. In a typical scenario, enterprise private cloud users have to make their resource requirements personally known to an IT administrator, which can create a significant bottleneck in the allocation process. Also, at least in part due to the inefficiency of the resource allocation process, users tend to hold their allocated resources much longer than they actually need to, which can lead to considerable wastage of resources. These and other difficulties in allocation of resources and tracking of resource utilization among users and business units can prevent the enterprise from charging its business units based on their actual resource utilization.

SUMMARY OF THE INVENTION

An illustrative embodiment of the present invention provides an information processing system in which information technology resources of a distributed virtual infrastructure of an enterprise private cloud are requested by users and allocated to those users in an automated and standardized manner that facilitates the tracking of actual utilization of the allocated resources by the requesting users, as well as the reporting of such utilization not only to the requesting users but also to associated entities within the enterprise such as business unit managers and information technology administrators.

In one aspect, an apparatus for allocating and tracking utilization of information technology resources of a distributed virtual infrastructure comprises at least one processing platform associated with the distributed virtual infrastructure. The processing platform comprises at least one processing device having a processor coupled to a memory. The processing platform is operative to allocate at least a designated one of the information technology resources to a user responsive to a corresponding request, to track utilization of the designated information technology resource allocated to the user, and to generate one or more notifications if the utilization of the designated information technology resource by the user falls below a specified threshold. The distributed virtual infrastructure may comprise an enterprise private cloud infrastructure.

The illustrative embodiments advantageously overcome one or more of the above-noted drawbacks of conventional approaches that fail to provide adequate allocation and tracking of resources among users and business units within an enterprise private cloud environment. For example, these embodiments provide an automated and standardized process for allocating information technology resources responsive to user requests and tracking actual utilization of the allocated resources on a user by user basis. Also, these embodiments allow implementation of a particularly efficient pay-for-use charging system in an enterprise private cloud environment. This user-centric approach makes users aware of the costs associated with their information technology resource allocations, such that users will be less likely to request resources that they do not really need. Notifications of potential resource wastage by users are also provided to other related entities, such as business unit managers and information technology administrators. As a result, the potential for wastage of information technology resources is considerably reduced, as are the costs associated with installing and maintaining information technology infrastructure.

These and other features and advantages of the present invention will become more readily apparent from the accompanying drawings and the following detailed description.

BRIEF DESCRIPTION OF THE DRAWINGS

FIG. 8 is a diagram illustrating one example of a pay-for-use charging arrangement in the FIG. 1 system.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of systems comprising distributed virtual infrastructure. However, a given embodiment need not comprise distributed virtual infrastructure, and may more generally comprise any arrangement of one or more processing devices.

Figure 1:
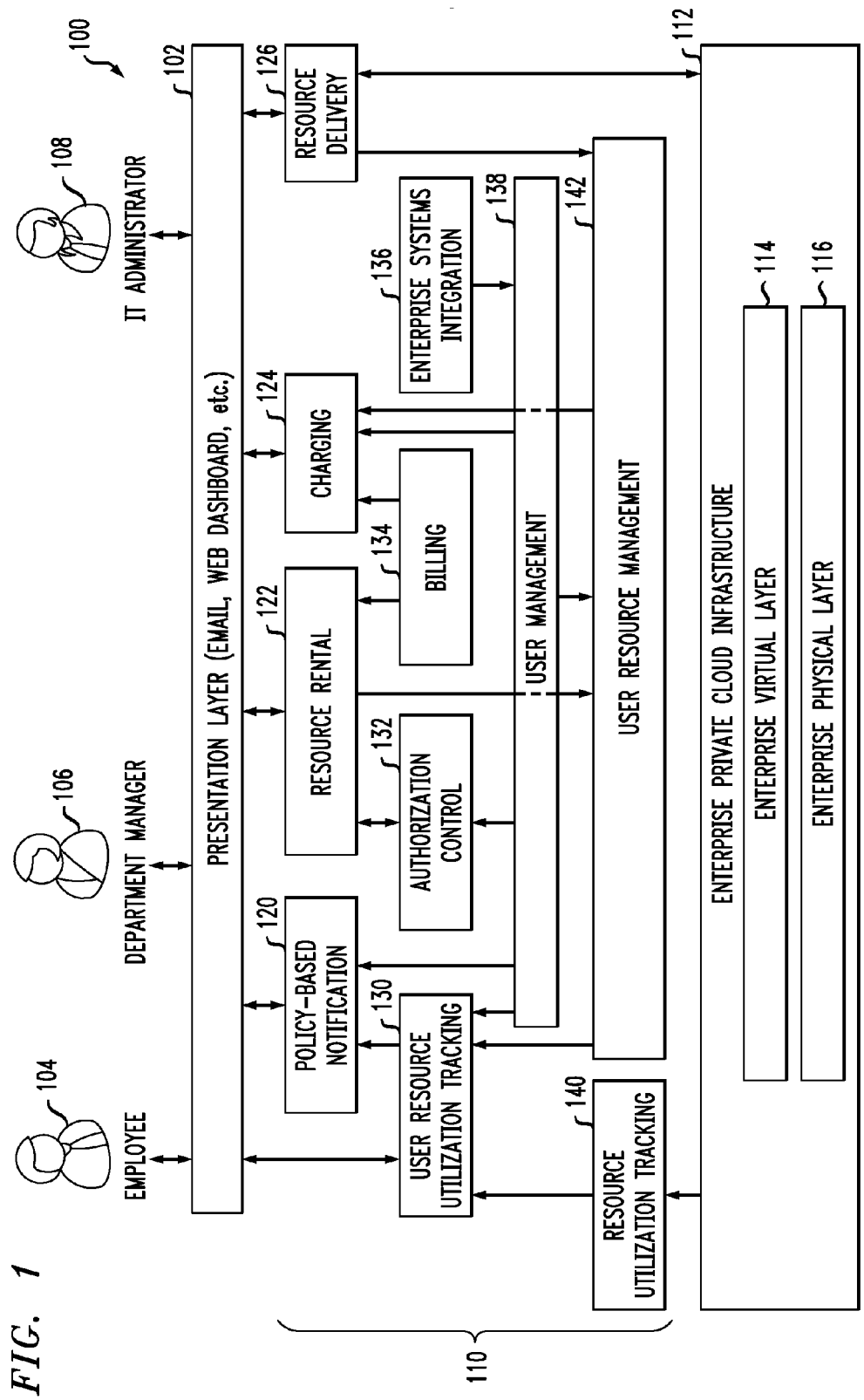
FIG. 1 shows an information processing system with resource allocation and utilization tracking in an illustrative embodiment of the invention.

FIG. 1 shows an information processing system 100 configured in accordance with an illustrative embodiment of the present invention. The information processing system 100 comprises a presentation layer 102 that serves as an interface between the system 100 and a number of different entities, including an employee 104, a department manager 106 and an information technology (IT) administrator 108. The employee 104 is an example of what is more generally referred to herein as a "system user" or simply a "user." The presentation layer 102 may comprise multiple interface elements, including by way of example email, a web dashboard, etc.

The system 100 further comprises at least one processing platform that implements a plurality of processing modules 110 that collectively control access to and utilization of various information technology resources of an enterprise private cloud infrastructure 112. In one aspect of the invention, these modules 110 are collectively operative to allocate at least a designated one of the information technology resources to a system user responsive to a corresponding request, to track utilization of the designated information technology resource allocated to the user, and to generate one or more notifications if the utilization of the designated information technology resource by the user falls below a specified threshold. The presentation layer 102 may be implemented by the same processing platform used to implement at least a portion of the processing modules 110, or a different processing platform.

It should be noted that system elements 102 and 110 may be entirely separate from the enterprise private cloud infrastructure 112, as is illustrated in the embodiment of FIG. 1. In such an embodiment, the processing platform(s) implementing system elements 102 and 110 may be entirely independent of the underlying enterprise private cloud infrastructure, but are configured to leverage certain functionality provided by that infrastructure in order to control access to resources and collect utilization data.

However, although the system elements 102 and 110 are shown in the FIG. 1 embodiment as being entirely separate from the enterprise private cloud infrastructure 112, one or more of such elements may be implemented at least in part within the enterprise private cloud infrastructure in other embodiments.

The enterprise private cloud infrastructure 112, which illustratively comprises an enterprise virtual layer 114 and an enterprise physical layer 116, is an example of what is more generally referred to herein as a "distributed virtual infrastructure." Such a distributed virtual infrastructure may comprise, by way of example, a hypervisor platform and associated services that allow physical systems, network and data to be abstracted into their virtual form. An example of a commercially available hypervisor platform suitable for use in an embodiment of the invention is the VMware® vSphere™ which may include vCenter™. The distributed virtual infrastructure may further comprise one or more distributed processing platforms that include hardware products such as Celerra® and CLARiiON®, both commercially available from EMC Corporation of Hopkinton, Mass.

The processing modules 110 in the present embodiment include a policy-based notification module 120, a resource rental module 122, a charging module 124, a resource delivery module 126, a user resource utilization tracking module 130, an authorization control module 132, a billing module 134, an enterprise systems integration module 136, a user management module 138, a resource utilization tracking module 140, and a user resource management module 142. Although shown as being separate from the modules 110 in the present embodiment, the presentation layer 102 may be implemented as a corresponding presentation interface module within the set of modules 110 in other embodiments. Such a presentation module generally provides an interface between the user and functionalities of the modules 110 such as resource allocation, delivery, utilization tracking, utilization notification and utilization fee charging. The operation of the modules 110 will be described in greater detail below with reference to FIGS. 3 through 8.

It is to be appreciated that the particular arrangement of modules 110 shown in FIG. 1 is presented by way of illustrative example only, and in other embodiments different arrangements of additional or alternative modules may be used. Moreover, the functionalities associated with separate modules in the FIG. 1 embodiment may be combined into a lesser number of modules each of which performs multiple functions. Thus, at least a subset of the processing modules 110 may be collectively implemented on a common processing platform, or each such module may be implemented on a separate processing platform comprising one or more servers, computers or other processing devices.

Figure 2:
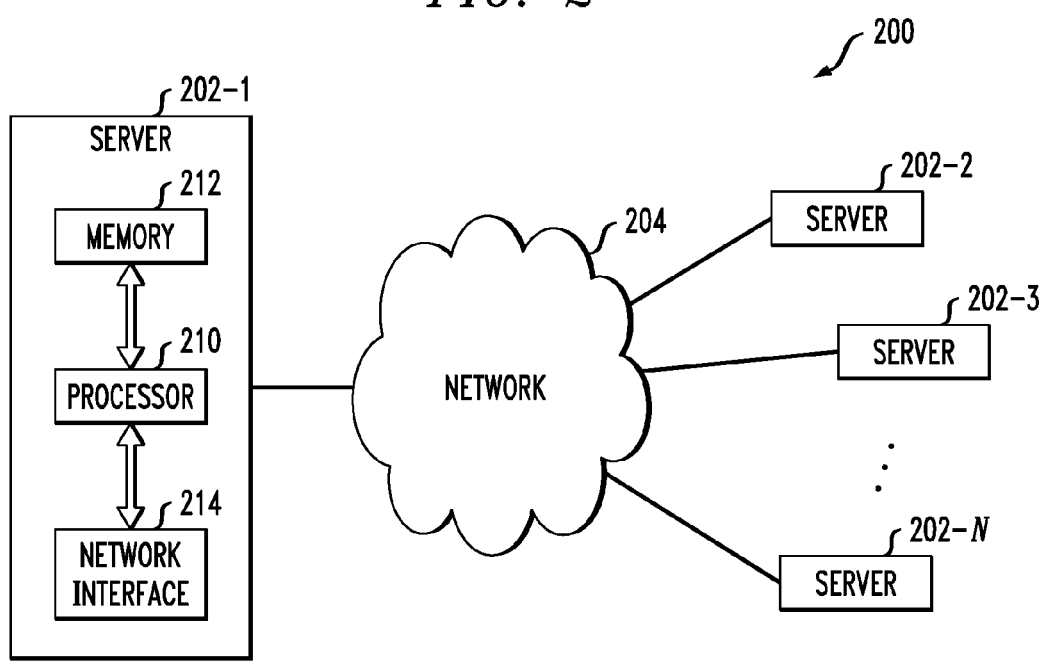
FIG. 2 shows a more detailed view of a portion of the FIG. 1 system.

An example of such a processing platform is processing platform 200 shown in FIG. 2. The processing platform 200 in this embodiment comprises a portion of the system 100 and includes a plurality of servers, denoted 202-1, 202-2, 202-3, . . . 202-N, which communicate with one another over a network 204. One or more of the processing modules 110 of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the information processing system 100. Again, multiple modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the modules 110. One skilled in the art would be readily able to implement such software, given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

In the system 100, the term "information technology resource" is used to denote an allocable resource of the enterprise private cloud infrastructure 112. Such resources may comprise physical machines, virtual machines, virtual switches, storage volumes or other system elements in any combination. For example, a given information technology resource may comprise a virtual cluster containing a designated number of virtual machines and a designated number of network attached storage volumes.

It is to be appreciated that a given embodiment of the system 100 may include multiple instances of the components 102, 110 and 112, and other system elements, although only single instances of such components and elements are shown in the system diagram for clarity and simplicity of illustration.

Also, numerous other arrangements of servers, computers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

The operation of the processing modules 110 will now be described in greater detail with reference to FIGS. 3 through 8.

Figure 3:
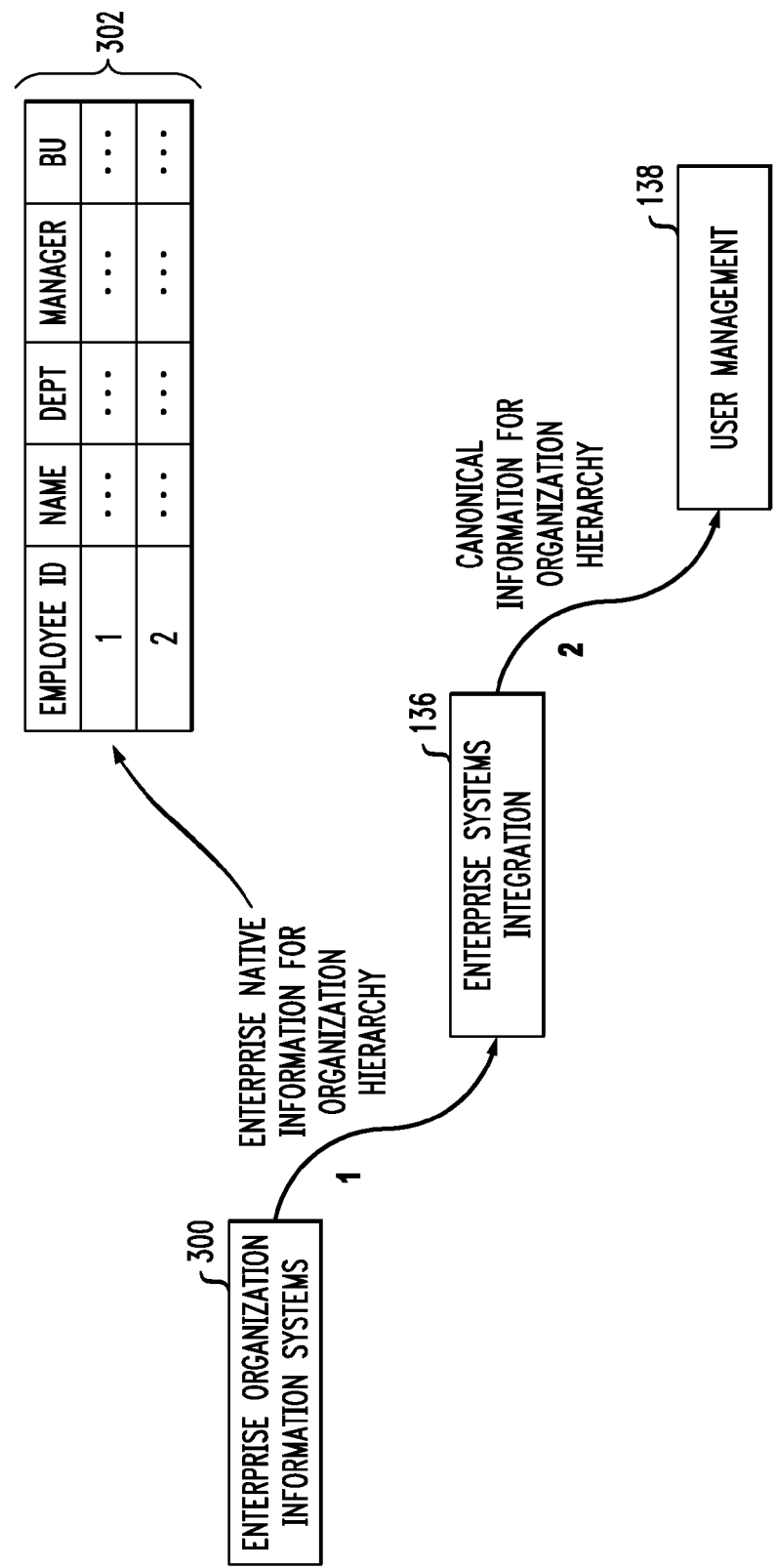
FIG. 3 is a diagram illustrating the importing of enterprise organization hierarchy information into the FIG. 1 system.

Referring initially to FIG. 3, operations associated with importing of enterprise organization hierarchy information into the system 100 are shown. The operations involve enterprise organization information systems 300 which are assumed to be external to the system 100 as illustrated in FIG. 1. As shown at step 1, the enterprise systems integration module 136 obtains enterprise organization hierarchy information from one or more of the enterprise organization information systems 300. This information may comprise enterprise native information of the form shown generally at 302, which illustratively includes for each of a plurality of employees of the enterprise an employee identifier (ID), employee name, employee department, employee manager and employee business unit (BU). Other types of enterprise organization hierarchy information may be used in other embodiments. In step 2, the enterprise systems integration module 136 provides canonical enterprise organization hierarchy information to the user management module 138.

Figure 4:
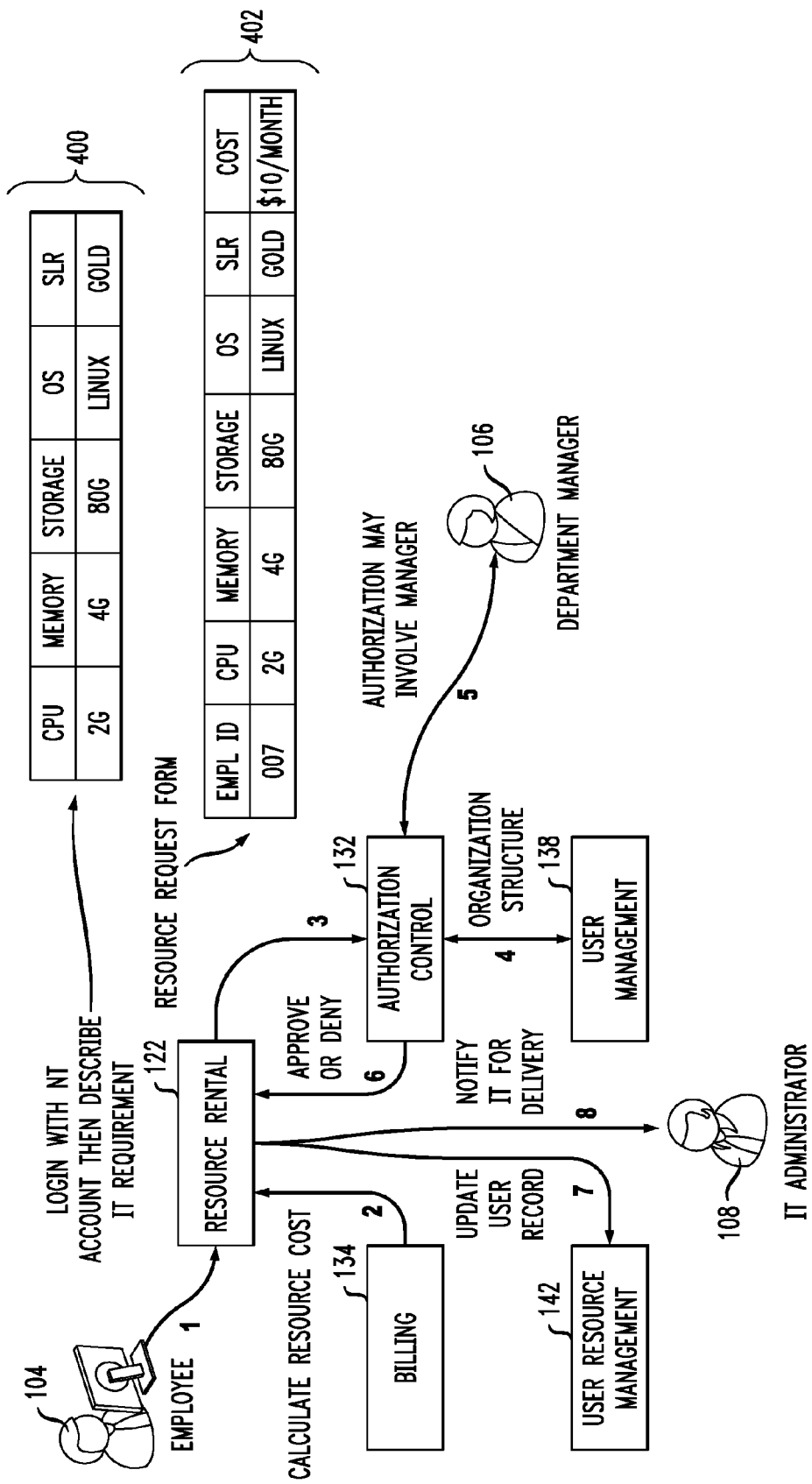
FIGS. 4, 5 and 6 are diagrams illustrating respective rental, delivery and utilization tracking of information technology resources in the FIG. 1 system.

FIG. 4 illustrates operations associated with employee rental of information technology resources of the enterprise private cloud infrastructure 112. The operations involve the employee 104, department manager 106 and IT administrator 108, as well as resource rental module 122, authorization control module 132, billing module 134, user management module 138, and user resource management module 142.

In step 1, the resource rental module 122 receives a user description of an information technology resource requirement 400 from the employee 104 user via the presentation layer 102. The employee 104 enters such a description after logging in to his or her network technology (NT) account. The requirement 400 in this embodiment comprises specifications for central processing unit (CPU), memory, storage, operating system (OS) and service level requirement (SLR), although other specifications or requirement description parameters could be used in other embodiments. The resource rental module 122 in step 2 interacts with the billing module 134 to calculate the cost of the requested resource. In step 3, the resource rental module 122 generates from the user description of resource requirement 400 a resource request form 402 that incorporates, in addition to the specifications of the requirement 400, the employee ID and the cost of the resource requirement as obtained from the billing module 134. The resource request form is provided to the authorization control module 132, also as part of step 3.

The authorization control module 132 in step 4 accesses the enterprise organization hierarchy information in the user management component 138 in determining whether to approve or deny the resource request. This determination in step 5 further involves interaction with department manager 106. The authorization control module 132 then sends an approval or denial of the request to the resource rental module 122 in step 6. Assuming that the request is approved, the resource rental module 122 in step 7 updates a user record in the user resource management module 142, and in step 8 provides a notification to the IT administrator 108 that the request has been approved and further that the resource should be subsequently delivered to the requesting user.

Figure 5:
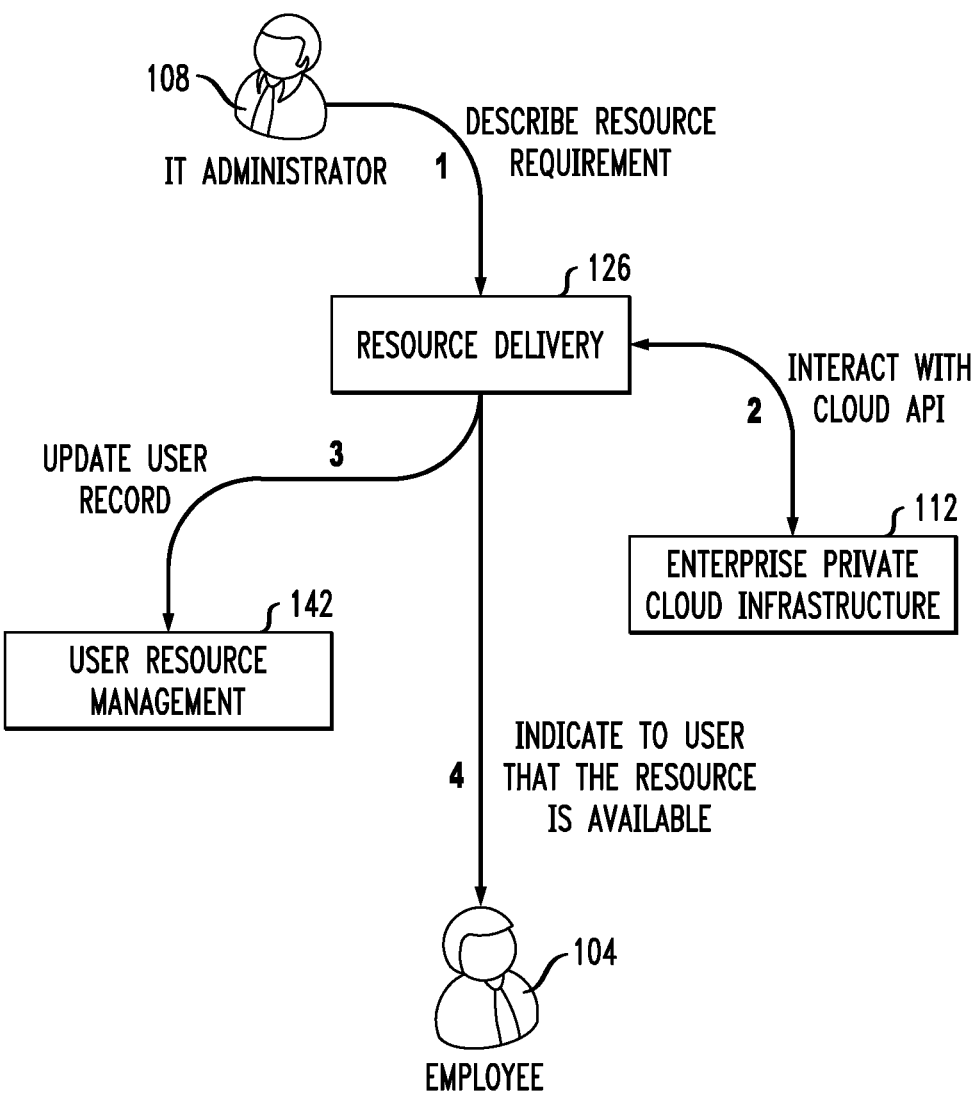

Referring now to FIG. 5, operations associated with delivery of the requested resource are shown. It should be noted that the term "delivery" in this context does not refer to physical delivery of the resource, but instead refers to making an allocated resource accessible to the requesting user. The operations involve the employee 104 and IT administrator 108, as well as enterprise private cloud infrastructure 112, resource delivery module 126, and user resource management module 142.

In step 1, the resource delivery module 126 receives an administrator description of an information technology resource requirement from the IT administrator 108 via the presentation layer 102. Responsive to receipt of that description, the resource delivery module 126 in step 2 interacts with an application programming interface (API) of the enterprise private cloud infrastructure 112 to ensure that the appropriate resource is allocated. The resource delivery module 126 in step 3 updates a user record for the requesting employee in the user resource management module 142. In step 4, the resource delivery module 126 provides an indication via the presentation layer 102 to the employee 104 that the corresponding resource is available for use by that employee.

Figure 6:
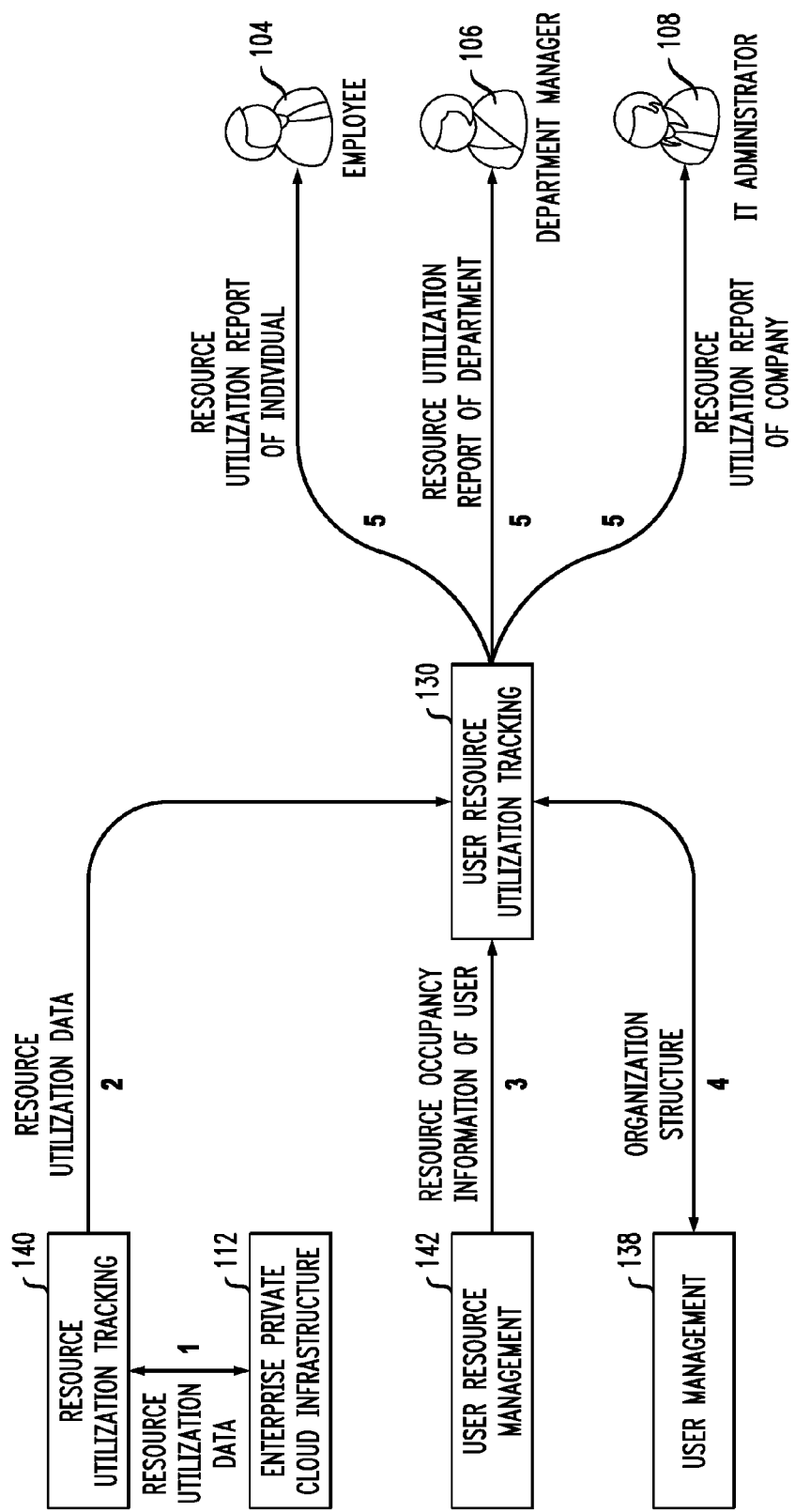

FIG. 6 illustrates operations associated with utilization tracking of allocated information technology resources in the system 100. The operations involve the employee 104, department manager 106 and IT administrator 108, as well as enterprise private cloud infrastructure 112, user resource utilization tracking module 130, user management module 138, resource utilization tracking module 140, and user resource management module 142.

In step 1, the resource utilization tracking module 140 obtains resource utilization data from the enterprise private cloud infrastructure 112 and in step 2 provides that data to the user resource utilization tracking module 130. The user resource utilization tracking module 130 in step 3 receives resource occupancy information for the user from the user resource management module 142, and in step 4 receives enterprise organization hierarchy information from the user management module 138. In step 5, the user resource utilization tracking module 130 generates multiple resource utilization reports. These reports include a resource utilization report of the individual requesting employee 104, a resource utilization report of the department that includes the employee 104, and a resource utilization report of the company that includes the department, and are presented via the presentation layer 102 to the employee 104, department manager 106 and IT administrator 108, respectively.

Figure 7:
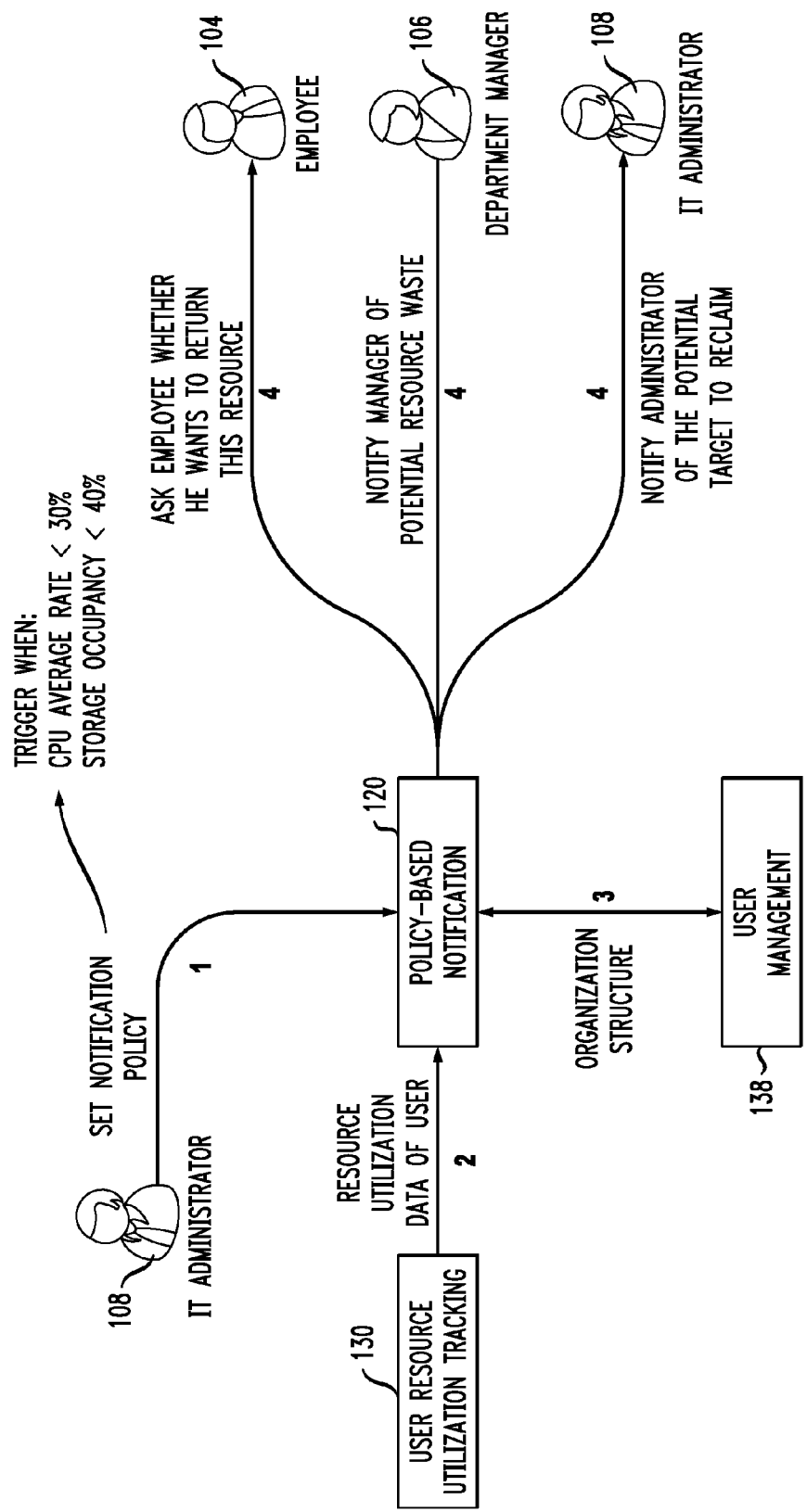
FIG. 7 is a diagram illustrating policy-based notification in the FIG. 1 system.

Referring now to FIG. 7, operations associated with policy-based notification within the system 100 are shown. The operations involve the employee 104, department manager 106 and IT administrator 108, as well as policy-based notification module 120, user resource utilization tracking module 130, and user management module 138.

In step 1, the policy-based notification module 120 receives from the IT administrator 108 a notification policy relating to a resource allocated to the employee 104. In this example, the notification policy set by the IT administrator 108 specifies that notifications should be triggered when utilization of the allocated resource is such that an average CPU rate is less than 30% and storage occupancy is less than 40%. Numerous other types of thresholds may be used, in any combination. In step 2, the policy-based notification module 120 obtains resource utilization data for the allocated resource from the user resource utilization tracking module 130. The policy-based notification module 120 in step 3 then obtains enterprise organization hierarchy information from the user management module 138, and in step 4 generate notifications in accordance with the notification policy for presentation via the presentation layer 102. These notifications in the present embodiment include a notification to the employee 104 requesting that the employee release the underutilized resource, a notification to the department manager 106 indicating that continued allocation of the resource to employee 104 may be wasteful, and a notification to the IT administrator 108 indicating that the allocated resource is a potential resource reclaim target. Although in this example the notification policy is set by the IT administrator 108, in other embodiments the notification policy could be set by employee 104 or department manager 106.

FIG. 8 illustrates operations associated with a pay-for-use charging arrangement in the system 100. The operations involve the department manager 106 and a comptroller or other finance officer 800, as well as charging module 124, billing module 134, user management module 138, and user resource management module 142.

In step 1, the billing module 134 calculates a resource cost for the information technology resource requirement of the requesting user. The charging module 124 receives the resource cost from the billing module 134, and in step 2 receives resource occupancy information for the user from the user resource management module 142. In step 3, the charging module 124 receives enterprise organization hierarchy information from the user management module. The charging module 124 in step 4 then generates from the received resource cost, resource occupancy information, and enterprise organization hierarchy information an information technology service bill for delivery to the department manager 106, and an information technology service bill report for delivery to the finance officer 800.

It should be noted that the particular processing operations and other system functionality described in conjunction with the diagrams of FIGS. 3 through 8 are presented by way of illustrative example only, and should not be construed as limiting the scope of the invention in any way. Alternative embodiments can use other types of processing operations for resource allocation, utilization tracking, notifications, etc.

The illustrative embodiments provide numerous advantages over conventional techniques. For example, these embodiments provide an automated and standardized process for allocating information technology resources responsive to user requests and tracking actual utilization of the allocated resources on a user by user basis. Also, these embodiments allow implementation of a particularly efficient pay-for-use charging system in an enterprise private cloud environment. This user-centric approach makes users aware of the costs associated with their resource allocations, such that users will be less likely to request resources that they do not really need. Notifications of potential resource wastage by system users are also provided to other related entities, such as business unit managers and information technology administrators. As a result, the potential for wastage of information technology resources is considerably reduced, as are the costs associated with installing and maintaining information technology infrastructure.

As indicated previously, functionality such as that described in conjunction with the diagrams of FIGS. 3 through 8 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform associated with a distributed virtual infrastructure of a private cloud of an enterprise, the distributed virtual infrastructure comprising a plurality of information technology resources, the processing platform comprising at least one processing device having a processor coupled to a memory, wherein the processing platform is operative to allocate at least a designated one of the information technology resources to a user responsive to a corresponding request, to track utilization of the designated information technology resource allocated to the user, and to generate two or more notifications if said utilization of the designated information technology resource by the user falls below a specified threshold;
   wherein the processing platform implements a plurality of processing modules comprising:
      a presentation module providing an interface between the user and other ones of the plurality of processing modules;
      a resource utilization tracking module;
      a user management module; and a resource utilization notification module comprising a policy-based notification module, the policy-based notification module being operative to receive an indication of a notification policy relating to a resource allocated to the user, to obtain resource utilization data for that resource from the resource utilization tracking module, to obtain enterprise organization hierarchy information from the user management module, and to generate the two or more notifications in accordance with the notification policy; and wherein the two or more notifications comprise:
a first notification to the user requesting that the user release the resource; and
at least a second notification to an entity of the enterprise other than the user, said entity being determined using the enterprise organization hierarchy information.

2. The apparatus of claim 1 wherein the plurality of processing modules further comprises:
a resource allocation module;
a resource delivery module; and
a utilization fee charging module.

3. The apparatus of claim 2 wherein the resource delivery module is operative to receive an administrator description of an information technology resource requirement from an information technology administrator via the presentation module, and responsive to said administrator description is operative to interact with an application programming interface of the distributed virtual infrastructure, to update a user record in a user resource management module, and to provide an indication via the presentation module to the user that the corresponding resource is available.

4. The apparatus of claim 2 wherein the resource utilization tracking module is operative to obtain resource utilization data from the distributed virtual infrastructure and to provide said data to an associated user resource utilization tracking module that receives resource occupancy information for the user from a user resource management module and the enterprise organization hierarchy information from the user management module.

5. The apparatus of claim 4 wherein the user resource utilization tracking module is operative to generate one or more of:
a resource utilization report of the user, which is presented to that user via the presentation module;
a resource utilization report of a business unit that includes the user, which is presented to a manager of said business unit via the presentation module; and
a resource utilization report of the enterprise that includes said business unit, which is presented to an information technology administrator of said enterprise via the presentation module.

6. The apparatus of claim 2 wherein the utilization fee charging module further comprises:
a billing module operative to calculate a resource cost for an information technology resource requirement of the user; and
a charging module operative to receive the resource cost from the billing module, to receive resource occupancy information for the user from a user resource management module, and to receive the enterprise organization hierarchy information from the user management module, the charging module being further operative to generate from the received resource cost, resource occupancy information, and enterprise organization hierarchy information an information technology service bill for delivery to a manager of a business unit that includes the user, and an information technology service bill report for delivery to a finance officer of the enterprise that includes the business unit.

7. The apparatus of claim 1 wherein the processing platform is implemented at least in part within the distributed virtual infrastructure.

8. The apparatus of claim 1 wherein the plurality of processing modules further comprises an enterprise systems integration module operative to obtain the enterprise organization hierarchy information from one or more enterprise organization information systems and to provide the enterprise organization hierarchy information to the user management module.

9. The apparatus of claim 8 wherein the enterprise hierarchy information comprises for each of a plurality of employees of the enterprise an employee identifier, employee name, employee department, employee manager and employee business unit.

10. The apparatus of claim 8 wherein the resource allocation module further comprises:
a resource rental module operative to receive a user description of an information technology resource requirement from the user via the presentation module and to generate from that user description a resource request form; and
an authorization control module operative to receive the resource request form from the resource rental module and to approve or deny the corresponding request.

11. The apparatus of claim 10 wherein the utilization fee charging module further comprises a billing module operative to calculate a resource cost for the information technology resource requirement for incorporation into said resource request form.

12. The apparatus of claim 10 wherein the authorization control module accesses the enterprise organization hierarchy information in the user management module in determining whether to approve or deny said request.

13. The apparatus of claim 10 wherein the plurality of modules further comprises a user resource management module, and upon approval of said request, the resource rental module updates a user record in the user resource management module, and provides a notification to an information technology administrator regarding the approval of said request.

14. The apparatus of claim 1 wherein the second notification comprises a notification to a manager of a business unit that includes the user, indicating that continued allocation of the resource may be wasteful.

15. The apparatus of claim 1 wherein the second notification comprises a notification to an information technology administrator of the enterprise, indicating that the allocated resource is a potential resource reclaim target.

16. The apparatus of claim 1 wherein said at least a second notification comprises:
a notification to a manager of a business unit that includes the user, indicating that continued allocation of the resource may be wasteful; and
a notification to an information technology administrator of the enterprise that includes said business unit, indicating that the allocated resource is a potential resource reclaim target.

17. The apparatus of claim 1 wherein:
the designated information technology resources comprise at least one of: a physical or virtual machine; and a storage volume; and
the notification policy specifies triggers for the one or more notifications based on respective thresholds, wherein the specified threshold for the physical or virtual machine is different than the specified threshold for the storage volume.

18. A method comprising the steps of:
allocating at least a designated one of a plurality of information technology resources of a distributed virtual infrastructure of a private cloud of an enterprise to a user responsive to a corresponding request;
tracking utilization of the designated information technology resource allocated to the user; and
generating two or more notifications if said utilization of the designated information technology resource by the user falls below a specified threshold;
wherein generating the two or more notifications comprises:
receiving an indication of a notification policy relating to a resource allocated to the user;
obtaining resource utilization data for that resource;
obtaining enterprise organization hierarchy information for the enterprise comprising a business unit that includes the user; and
generating the two or more notifications in accordance with the notification policy, the two or more notifications comprising:
a first notification to the user requesting that the user release the resource; and
at least a second notification to an entity of the enterprise other than the user, said entity being determined using the enterprise organization hierarchy information;
wherein the allocating, tracking and generating steps are performed in at least one processing device comprising a processor coupled to a memory.

19. The method of claim 18 further comprising the steps of:
obtaining resource occupancy information for the user; and
generating at least one resource utilization report, comprising one or more of:
a resource utilization report of the user for presentation to the user;
a resource utilization report of the business unit for presentation to a manager of said business unit; and
a resource utilization report of the enterprise for presentation to an information technology administrator of said enterprise.

20. A computer program product comprising a non-transitory processor-readable storage medium having encoded therein executable code of one or more software programs, wherein the one or more software programs when executed by a processing platform cause the processing platform to implement the steps of:
allocating at least a designated one of a plurality of information technology resources of a distributed virtual infrastructure of a private cloud of an enterprise to a user responsive to a corresponding request;
tracking utilization of the designated information technology resource allocated to the user; and
generating two or more notifications if said utilization of the designated information technology resource by the user falls below a specified threshold;
wherein generating the two or more notifications comprises:
receiving an indication of a notification policy relating to a resource allocated to the user;
obtaining resource utilization data for that resource;
obtaining enterprise organization hierarchy information for the enterprise comprising a business unit that includes the user; and
generating the two or more notifications in accordance with the notification policy, the two or more notifications comprising:
a first notification to the user requesting that the user release the resource; and
at least a second notification to an entity of the enterprise other than the user, said entity being determined using the enterprise organization hierarchy information.

21. An information processing system comprising:
a distributed virtual infrastructure of a private cloud of an enterprise, the distributed virtual infrastructure comprising a plurality of information technology resources; and
at least one processing platform associated with the distributed virtual infrastructure, said processing platform being operative to allocate at least a designated one of the information technology resources to a user responsive to a corresponding request, to track utilization of the designated information technology resource allocated to the user, and to generate two or more notifications if said utilization of the designated information technology resource by the user falls below a specified threshold;
wherein the processing platform implements a plurality of processing modules comprising:
a presentation module providing an interface between the user and other ones of the plurality of processing modules;
a resource utilization tracking module;
a user management module; and
a resource utilization notification module comprising a policy-based notification module, the policy-based notification module being operative to receive an indication of a notification policy relating to a resource allocated to the user, to obtain resource utilization data for that resource from the resource utilization tracking module, to obtain enterprise organization hierarchy information from the user management module, and to generate the two or more notifications in accordance with the notification policy; and
wherein the two or more notifications comprise:
a first notification to the user requesting that the user release the resource; and
at least a second notification to an entity of the enterprise other than the user, said entity being determined using the enterprise organization hierarchy information.

* * * * *